United States Patent
Yoshida et al.

(10) Patent No.: US 6,238,566 B1
(45) Date of Patent: May 29, 2001

(54) MULTI-STAGE SOLVENT EXTRACTION OF METAL VALUE

(75) Inventors: Norifumi Yoshida; Jun-ichi Nakayama, both of Fukui-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/024,747

(22) Filed: Feb. 17, 1998

(30) Foreign Application Priority Data

Feb. 25, 1997 (JP) .................................................. 9-040513

(51) Int. Cl.⁷ .......................... B01D 59/24; B01D 59/10; B01D 53/02
(52) U.S. Cl. .......................... 210/638; 210/644; 210/649; 210/660; 423/8; 423/20; 423/21.1
(58) Field of Search .................................... 210/638, 644, 210/649, 660; 423/8, 10, 20, 21.1, 21.5

(56) References Cited

U.S. PATENT DOCUMENTS

| | | |
|---|---|---|
| 3,272,737 | 9/1966 | Hansen et al. . |
| 3,454,490 | 7/1969 | Wallace . |
| 3,615,170 * | 10/1971 | Hazen .................. 210/638 |
| 3,637,517 * | 1/1972 | Mathers et al. ............ 252/301.4 |
| 3,947,351 * | 3/1976 | Asawa et al. ............ 210/638 |
| 4,486,391 * | 12/1984 | Hashimoto ............... 423/9 |
| 4,497,785 * | 2/1985 | Tilley et al. ............ 423/263 |
| 4,765,905 * | 8/1988 | Kitamura et al. ............ 210/638 |
| 5,064,538 * | 11/1991 | Boeteng ................ 210/644 |
| 5,084,180 * | 1/1992 | Boateng ................ 210/638 |
| 5,135,652 | 8/1992 | Boateng ................ 210/634 |
| 5,300,228 * | 4/1994 | Sugaya et al. ............ 210/644 |
| 5,766,478 * | 6/1998 | Smith et al. ............ 210/638 |

FOREIGN PATENT DOCUMENTS

WO 95/03994    2/1995   (WO) .
WO 96/39550   12/1996   (WO) .

OTHER PUBLICATIONS

Patent Abstracts of Japan, vol. 11, No. 150 (C–422), May 15, 1987 & JP 61 284538 A (Nippon Mining Co Ltd;Others: 01), Dec. 15, 1986 & Database WPI Section Ch, Week 8704, Derwent Publications Ltd., London, GB; Class E36, AN 87–026661, XP002086552.

Chemical Abstracts, vol., 116, No. 24, Jun. 15, 1992, Columbus, Ohio, US; abstract No. 238308, Chen, Ruqing et al: "Preparation of a KS–1 diffusion dialysis membrane and its application in treatment of an acidic solution containing rare earth elements" XP002086551 & Shuichuli Jishu (1991), 17(4), 231–8 Coden: Shjieg;ISSN: 1000–3770, 1991.

* cited by examiner

*Primary Examiner*—Ana Fortuna
(74) *Attorney, Agent, or Firm*—Wenderoth, Lind & Ponack, L.L.P.

(57) ABSTRACT

Proposed is an improvement in a multi-stage solvent extraction process of a metal value such as rare earth elements from an acidic feed solution containing the metal value in the form of a water-soluble salt by bringing the aqueous solution into contact with a water-immiscible organic extractant solution containing an extractant compound which releases an acid when combined with the metal ions. While the concentration of the acid in the aqueous feed solution is increased when contacted with the organic extractant solution containing an extractant agent of the above mentioned type so as to cause a shift of the extraction equilibrium unfavorably against further extraction of the metal ions, the acid in the aqueous feed solution prior to contacting with the organic extractant solution in a succeeding stage of extraction is at least partly decreased, instead of the conventional expensive way of neutralization by the addition of an alkaline neutralizing agent to the aqueous solution, by ion exchange dialysis with dialyzing water through an anion exchange membrane.

2 Claims, No Drawings

MULTI-STAGE SOLVENT EXTRACTION OF METAL VALUE

BACKGROUND OF THE INVENTION

The present invention relates to a multi-stage solvent extraction process of a metal value such as rare earth elements or, more particularly, to an improvement in a multi-stage solvent extraction process of a metal value from an aqueous acidic solution containing the metal value into a water-immiscible organic extractant solution.

The process of solvent extraction or liquid-liquid extraction as a kind of the technologies for material separation is widely employed in the industries of non-metallic and metallic materials. For example, a metal value in a trace concentration can be efficiently recovered or collected by the solvent extraction method and a metallic element can be purified or separated from impurities or accompanying metallic elements, which can hardly be separated by a conventional chemical method, by solvent extraction. The basic procedure of solvent extraction method of a metal value is conducted by bringing an aqueous solution containing the metal value in the form of a water-soluble salt into contact with a water-immiscible organic solvent or an organic solution containing an extractant agent dissolved therein. The extractant compound is specific to the particular metallic element so that the metal value is selectively transferred from the aqueous phase to the organic phase.

The process of solvent extraction can be classified into two types depending on the nature of the extractant agent. In the solvent extraction process of the first type, the extractant agent is a neutral compound, such as tributyl phosphate (TBP) and quaternary ammonium compounds, with which the metallic element forms a complex compound to be extracted into the organic phase. Taking a tervalent metallic element denoted by M, such as a rare earth element, in the form as a nitrate of the metallic element and TBP as the extractant compound, the process of solvent extraction of this type can be expressed by the equation:

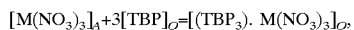
$$[M(NO_3)_3]_A + 3[TBP]_O = [(TBP_3) \cdot M(NO_3)_3]_O,$$

in which the subscript A or O at the right-hand side of the respective square brackets means that the species inside of the square brackets exists in the aqueous phase or in the organic phase, respectively.

In the solvent extraction process of the second type, which is a so-called ion-exchange solvent extraction process, the extractant agent is exemplified by phosphorus-containing organic acids, carboxylic acids, and β-diketone compounds with which the metallic ions are combined with release of an acid or hydrogen ions $H^+$. Denoting a phosphorus-containing organic acid soluble in an organic solvent by HP, the solvent extraction process of a tervalent metallic ions $M^{3+}$ can be expressed by the following equation:

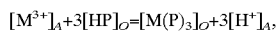
$$[M^{3+}]_A + 3[HP]_O = [M(P)_3]_O + 3[H^+]_A,$$

in which the subscripts A and O at the right-hand side of the square brackets each have the same meaning as explained above. The phosphorus-containing acidic extractant compound can be in the form of a dimer or trimer. Although the metal value in the above explanation is assumed to be in the form of a simple cation, the same principle of mechanism is applicable to complex ions formed between the metallic ions and anionic complex-forming ions.

In the solvent extraction process of the latter type, which is more efficient than the solvent extraction process of the former type, as is understood from the above given equation and in contrast to the solvent extraction process of the former type, the hydrogen ion concentration in the aqueous phase is increased as the extraction of the metallic ions proceeds leading to establishment of a state of extraction equilibrium between the aqueous phase and organic phase so that the process of extraction cannot proceed any further. A conventional method for accomplish further proceeding of the solvent extraction process is to decrease the hydrogen ion concentration in the aqueous phase by the addition of an alkaline compound, such as alkali metal hydroxides and ammonia water, to the aqueous phase thus to neutralize a part of the free acid therein. Needless to say, neutralization of a free acid, e.g., hydrochloric and nitric acids, with an alkaline compound produces a salt such as sodium chloride and ammonium nitrate. Accordingly, the solvent extraction process of the latter type, when practiced in a large scale, has disadvantages due to the large consumption of the alkaline compounds as a neutralizing agent and by-production of a large amount of salts to be disposed without causing any environmental pollution resulting in a great increase in the production costs.

SUMMARY OF THE INVENTION

The present invention accordingly has an object to provide a novel and improved method to accomplish a high degree of extraction in a solvent extraction process of a metal value from an aqueous solution containing the metal ions in the form of a water-soluble salt into an organic extractant phase according to the mechanism of the above explained latter type without consumption of a large amount of an alkaline compound as a neutralizing agent for the free acid contained in the aqueous phase.

Thus, the present invention provides an improvement, in a multi-stage solvent extraction process consisting of at least two successive stages of unit extraction treatments, in each of which an aqueous feed solution containing a metal value in the form of metal ions in the presence of an acid is contacted with a water-immiscible organic solution of an extractant agent capable of combining the metal ions with release of an acid to effect extraction of a part of the metal ions from the aqueous solution into the organic solution and the aqueous solution separated from the organic solution is, as an aqueous feed solution to the succeeding stage, further contacted with a water-immiscible organic solution of an extractant agent for the metal ions to effect extraction of a part of the remaining portion of the metal ions from the aqueous solution into the organic solution, which improvement comprises removing at least a part of the acid contained in the aqueous feed solution after the extraction treatment in a first stage by ion exchange dialysis through an ion exchange membrane prior to contacting with the organic solution in a second stage.

DETAILED DESCRIPTION OF THE PREFERRED EMBODIMENTS

As is understood from the above given description, the present invention is particularly applicable to the solvent extraction process of the latter type in which an acid is released into the aqueous phase from the extractant agent in the organic phase as the extractant molecules are combined with the metal ions. Such an ion-exchange solvent extraction process is widely practiced for: (1) collection, purification or concentration of a metal value by the selective extraction of the metal value from an aqueous phase into an organic phase followed by recovery of the metal value from the organic phase; (2) purification of a metal value by the selective extraction of impurities accompanying the metal value in an aqueous phase into the organic phase; and (3) separation of different metal values from each other by utilizing the difference of the extraction coefficients or, namely the separation factor, between the metallic elements. The solvent extraction process of the third type is widely practiced for the separation of metallic elements which can hardly be separated each from the others by a conventional chemical separation procedure as for the separation of rare earth elements and separation of nickel and cobalt. In such a solvent extraction process, the metal value transferred from the aqueous feed solution into the organic extractant solution is re-transferred by using an acid solution as the so-called scrubbing agent in order to facilitate further processing of the metal value. The present invention can be applied to any of the solvent extraction processes of the above described three types.

The most characteristic feature of the present invention consists in the ion-exchange dialysis for the removal of the free acid contained in the aqueous feed solution coming from the preceding stage and to be introduced into the succeeding stage of the multi-stage solvent extraction process. The free acid contained in the aqueous feed solution here implied includes not only the acid back-extracted from the organic phase to the aqueous phase but also the acid contained in the initial aqueous feed solution of the metal value prepared by dissolving a metal-containing starting material such as oxides in an acid as well as the acid intentionally added to the aqueous phase with a purpose of scrubbing.

In conducting the ion-exchange dialysis of the acidic aqueous feed solution coming from the preceding stage of the multi-stage solvent extraction process, it is advantageous, in order to have extended durability of the ion-exchange membrane, that any organic matters contained in the aqueous feed solution, such as the organic extractant solution intermixed in the preceding stage of aqueous-organic contacting, are removed as completely as possible, for example, by the treatment with active carbon prior to introduction of the aqueous solution into the dialyzer for ion-exchange dialysis, in which the acidic aqueous feed solution and the dialyzing water are brought into counter-current contact with intervention of an ion-exchange membrane between the compartments for the aqueous and organic solutions. Since no organic material has a possibility to enter the aqueous solution in the course of the ion-exchange dialysis, in which the aqueous acidic solution is subjected to ion exchange dialysis with dialyzing water of a low acid concentration only through an ion-exchange membrane, the aqueous solution after the ion-exchange dialysis can be introduced as such as the aqueous feed solution into the succeeding stage of the multi-stage solvent extraction process. The dialyzing water, which carries off the acid transferred from the aqueous acidic feed solution through the ion-exchange membrane, can be plain water, preferably, after deionization or, in some cases, can be an acidic aqueous solution of which the acid concentration is lower than in the aqueous feed solution to be subjected to the ion-exchange dialysis. The "diffusion fluid", which means the aqueous solution containing the acid removed from the aqueous acidic feed solution and entering the dialyzing water in the dialysis treatment, can be used for the preparation of a starting aqueous feed solution of the metal value or as a scrubbing aqueous solution either as such or, if necessary, after increasing the acid concentration by evaporation or by the addition of a fresh portion of the acid.

Since the starting aqueous feed solution containing the metal value is prepared usually by dissolving a metal-containing starting material, such as rare earth oxide mixtures, in an inorganic acid such as hydrochloric acid, nitric acid, sulfuric acid and perchloric acid, the aqueous feed solution of the metal value to be introduced into a stage of the solvent extraction process contains the metal value in the form of a salt of the metallic element with the anions of these acids and a certain amount of the free acid. Since the object of the invention is to selectively remove the acid contained in the aqueous feed solution in combination with the metal salts by ion-exchange dialysis through an ion-exchange membrane, the ion-exchange membrane is preferably a strongly basic anion-exchange membrane. Various grades of anion-exchange membranes can be used in the present invention without particular limitations including those available on the market and suitable as a dialysis membrane in conventional diffusion dialyzers. Various models of diffusion dialyzers are available as a commercial product and can be used as such in the present invention.

The extractor, i.e. a vessel in which the unit step of the solvent extraction process is conducted, for bringing the aqueous acidic feed solution into contact with a water-immiscible organic extractant solution is also not particularly limitative depending on the particulars of the process conditions.

Examples of the extractant agent, which is a compound capable of combining the ions of the metallic element with release of hydrogen ions $H^+$, include β-diketone compounds such as acetylacetone and thenoyl trifluoroacetone, phosphorus-containing organic acidic compounds such as di(2-ethylhexyl)phosphoric acid, bis[2-(1,3,3'-trimethylbutyl-5,7,7'-trimethyloctyl]phosphoric acid and bis (2,4,4'-trimethylphenyl)phosphinic acid and carboxylic acids such as various kinds of naphthenic acids. These extractant compounds are used usually in the form of a solution by dissolving the same in an organic solvent which is preferably a water-immiscible aliphatic or aromatic hydrocarbon solvent such as kerosene and xylene. The concentration of the extractant compound in the organic extractant solution is not particularly limitative.

It is desirable that the extraction treatment is conducted at a controlled temperature in order to obtain reproducible results. As is usual, contacting of the aqueous feed solution and the organic extractant solution in a batch-wise process is conducted by vigorously agitating each a specified volume of the solutions in an extractor vessel by operating a stirrer until, though not essential, establishment of an extraction equilibrium. The revolution velocity of the stirrer cannot be specified since the efficiency of agitation greatly differs depending on the particular design of the stirrer blades and other factors. As the agitation of the liquid mixture is continued, the aqueous and organic phases are dispersed each into the other to form a milky liquid mixture which, however, is separated into two phases by standing in the vessel. While the length of time during which the milky liquid mixture should be kept standing to effect phase separation into the aqueous and organic phases naturally depends on various factors such as temperature, kind of the solvent, kind and concentration of the extractant compound and volume ratio of the aqueous phase and the organic phase, it is usually sufficient that the milky liquid mixture after completion of agitation or termination of the stirrer revolution is kept standing for 5 to 30 minutes.

The aqueous feed solution to be introduced into the succeeding stage of the solvent extraction process containing the metal value after ion-exchange dialysis for the removal of the acid from the aqueous solution coming from the preceding stage of the extraction process is brought into contact with an organic extractant solution which either can be the organic extractant solution coming from the preceding stage of the extraction process already containing a certain amount of the metal value or can be a fresh portion of the organic extractant solution or an organic extractant solution coming from any other stages of the extraction process using a conventional multi-stage countercurrent extractor such as so-called mixer-settlers provided that the concentration of the metal value therein is low enough. It is also a possible way of the extractor arrangement that an ion-exchange dialyzer is built within the extractor so that the aqueous solution after extraction of a part of the metal ions is directly subjected to the ion-exchange dialysis to remove a part of the acid contained therein.

In the following, an Example and a Comparative Example are given to illustrate the present invention in more detail although the scope of the present invention is never limited thereby in any way.

EXAMPLE

A rare earth oxide mixture consisting of the oxides of yttrium, lanthanum, neodymium, samarium, gadolinium, dysprosium, erbium and ytterbium was dissolved in a hydrochloric acid solution to prepare an aqueous solution containing the chlorides of the rare earth elements in a total rare earth concentration of 1.15 moles/liter, of which the concentration of free acid was 0.06 mole/liter, in a volume of 1.5 liters, which was used as the aqueous feed solution in the extraction tests.

Separately, an organic extractant solution in a volume of 12 liters was prepared by dissolving 4 liters of 2'-ethylhexyl 2-ethylhexyl phosphonate in 8 liters of kerosene.

The above prepared aqueous feed solution and the organic extractant solution were introduced into an extractor vessel equipped with a stirrer of an extraction apparatus and the solutions were vigorously agitated with the stirrer rotated at 600 rpm in a room thermo-statted at 25±3° C. for 30 minutes to establish an extraction equilibrium for the partial extraction of the rare earth value from the aqueous feed solution into the organic extractant solution. The extractor vessel was a square vessel of 20 cm a side and 50 cm depth having a capacity of 20 liters and made from transparent rigid boards of a polyvinyl chloride resin.

The liquid mixture in a seemingly emulsified state was kept standing for 30 minutes with the stirrer rotation interrupted so that phase separation of the liquid mixture took place into an organic phase in the upper layer and an aqueous phase in the lower layer, of which 1.5 liters of the aqueous solution were taken out of the vessel while 12 liters of the organic extractant solution were left in the vessel.

The aqueous solution partially depleted of the rare earth value was analyzed for the concentrations of the rare earth elements and the acid to find that the concentration of the rare earth elements was 0.817 mole/liter corresponding to about 29% extraction of the rare earth value into the organic extractant solution and the concentration of free acid, i.e. [$H^+$], was 0.922 mole/liter.

The 1.5 liter volume of the aqueous feed solution after partial depletion of the rare earth value in the above described first stage extraction was passed through a compartment of a diffusion dialyzer (Model TSD-2, manufactured by Tokuyama Co.) at a flow rate of 0.62 liter/hour taking about 2.4 hours while deionized water as the dialyzing water was passed at a flow rate of 0.57 liter/hour through the other compartment of the dialyzer partitioned from the compartment for the aqueous feed solution with a strongly basic anion exchange membrane (Neoseptor AFN, a product by Tokuyama Co.) having an overall contacting area of 0.4 $m^2$ in the Cl-form. The aqueous feed solution after this ion exchange dialysis treatment, of which the volume had been increased to 2.3 liters from 1.5 liters, was again analyzed to find that the concentration of the rare earth elements was 0.514 mole/liter and the concentration of free acid, i.e. [$H^+$], was 0.01 mole/liter. The dialyzing water after the ion exchange dialysis in a total volume of 1.38 liters was also analyzed to find that the concentration of the rare earth elements was 0.0427 mole/liter and the concentration of acid, i.e. [$H^+$], was 0.610 mole/liter.

The aqueous feed solution in a volume of 2.3 liters after the first stage extraction followed by the ion exchange dialysis treatment described above was returned to the extractor vessel containing 12 liters of the organic extractant solution for the second stage extraction in substantially the same manner as in the first stage extraction and the liquid mixture was kept standing in the extractor vessel for 30 minutes to cause phase separation into an organic phase in the upper layer and an aqueous phase in the lower layer, of which the organic extractant solution was left as such in the extractor vessel and the aqueous solution was taken out and analyzed to find that the concentration of the rare earth elements was 0.377 mole/liter and the concentration of acid, i.e. [$H^+$], was 0.610 mole/liter.

The aqueous feed solution after further partial depletion of the rare earth value by the above described second stage extraction treatment was subjected to a second ion exchange dialysis treatment in the same manner as in the first dialysis treatment excepting for the modification of the flow rates of the feed solution and the dialyzing water to 0.63 liter/hour and 0.52 liter/hour, respectively. The aqueous feed solution after this second dialysis treatment, of which the volume had been increased to 2.9 liters, was analyzed to find that the concentration of the rare earth elements was 0.258 mole/liter and the concentration of acid, i.e. [$H^+$], was 0.02 mole/liter.

The aqueous feed solution after the second stage extraction and the second dialysis treatment in a volume of 2.9 liters was again returned into the extractor vessel and mixed there with the organic extractant solution kept in the vessel in substantially the same manner as in the extraction treatment of the preceding stages for the third stage extraction treatment followed by standing of the liquid mixture in the vessel for 30 minutes to cause phase separation into an organic phase in the upper layer and an aqueous phase in the lower layer, of which the organic extractant solution was left as such in the extractor vessel and the aqueous solution was taken out and analyzed to find that the concentration of the rare earth elements was 0.137 mole/liter and the concentration of acid, i.e. [$H^+$], was 0.364 mole/liter.

The aqueous feed solution after further partial depletion of the rare earth value by the above described third stage extraction treatment was subjected to a third ion exchange dialysis treatment in the same manner as in the first dialysis treatment excepting for the modification of the flow rates of the feed solution and the dialyzing water to 0.61 liter/hour and 0.52 liter/hour, respectively. The aqueous feed solution after this third dialysis treatment, of which the volume had been increased to 3.5 liters, was analyzed to find that the concentration of the rare earth elements was 0.113 mole/liter and the concentration of acid, i.e. [$H^+$], was 0.02 mole/liter.

The aqueous feed solution after the third stage extraction treatment and the third dialysis treatment in a volume of 3.5 liters was further returned into the extractor vessel and mixed there with the organic extractant solution in substantially the same manner as in the extraction treatment of the preceding stages for the fourth stage extraction treatment followed by standing of the liquid mixture in the vessel for 30 minutes to cause phase separation into an organic phase in the upper layer and an aqueous phase in the lower layer, of which the aqueous solution was taken out and analyzed to find that the concentration of the rare earth elements was 0.05 mole/liter and the concentration of acid, i.e. [$H^+$], was 0.210 mole/liter.

A conclusion obtained from the above described series of extraction experiments was that about 90% of the rare earth elements contained in the starting aqueous feed solution could be transferred into the organic extractant solution by repeating four stages of the extraction treatments when an ion exchange dialysis treatment for the removal of the acid from the aqueous feed solution was interposed between two successive stages of the extraction treatments absolutely without using any alkaline neutralizing agent.

Comparative Example

A starting aqueous feed solution of the rare earth elements in a concentration of 1.15 moles/liter was prepared in just the same formulation as in the Example described above. Separately, an organic extractant solution was prepared also in just the same manner as in the Example.

The same extractor vessel as used in the Example was charged with 1.5 liters of the rare earth-containing starting aqueous feed solution and 12 liters of the organic extractant solution and the solutions in the vessel were mixed together with the stirrer rotated at 600 rpm while 0.85 liter of a 5N aqueous solution of sodium hydroxide was added dropwise to the liquid mixture at a constant rate of 0.1 liter/minute. Agitation of the liquid mixture in the extractor vessel was continued for 30 minutes including the time taken for the introduction of the alkali solution.

The seemingly emulsified liquid mixture in the extractor vessel was kept standing therein for 30 minutes to cause phase separation into an organic phase in the upper layer and an aqueous phase in the lower layer. A small portion of the aqueous solution in the lower layer was taken and analyzed to find that the concentration of the rare earth elements therein was decreased from 1.15 mole/liter to 0.070 mole/liter corresponding to about 94% extraction of the rare earth value and the aqueous solution had a pH of 0.5.

What is claimed is:

1. In a multi-stage solvent extraction process comprising at least two successive stages of unit extraction treatments, in each of which an aqueous feed solution containing a rare earth value in the form of rare earth ions in the presence of an acid is contacted with a water-immiscible organic solution of an extractant agent capable of combining the rare earth ions with release of an acid to effect extraction of a part of the rare earth value from the aqueous solution into the organic solution and the aqueous solution separated from the organic solution is, as an aqueous feed solution to the succeeding stage, further contacted with a water-immiscible organic solution of an extractant agent for the rare earth ions to effect extraction of a part of the remaining portion of the rare earth ions from the aqueous solution into the organic solution, the improvement which comprises contacting the aqueous solution separated from the organic extractant solution after the extraction treatment of the first stage with an absorbent of an organic material, and subsequently removing at least a part of the acid contained in the aqueous feed solution by ion exchange dialysis through an ion exchange membrane prior to contacting the aqueous feed solution with the organic solution in a second stage.

2. The improvement as claimed in claim 1 in which the ion exchange membrane is a strongly basic anion exchange membrane.

\* \* \* \* \*